United States Patent [19]

Olsen

[11] Patent Number: 5,780,524
[45] Date of Patent: Jul. 14, 1998

[54] MICRO HEATING APPARATUS FOR SYNTHETIC FIBERS AND RELATED METHODS

[76] Inventor: Don E. Olsen, 405 Talbert Ave., Simi Valley, Calif. 93065-5249

[21] Appl. No.: 647,474

[22] Filed: May 14, 1996

[51] Int. Cl.$^6$ ............................................. C08J 3/28
[52] U.S. Cl. .......................... 522/2; 522/3; 522/164; 522/153; 522/154; 522/156
[58] Field of Search ............................ 522/2, 3, 159, 522/154, 156, 164

[56] References Cited

U.S. PATENT DOCUMENTS

| 4,156,124 | 5/1979 | Macken et al. | 219/121 |
| 4,950,862 | 8/1990 | Kajikawa | 219/121 |
| 5,017,423 | 5/1991 | Bossmann et al. | 428/224 |

Primary Examiner—Susan W. Berman
Attorney, Agent, or Firm—Frank Frisenda, Jr.

[57] ABSTRACT

This invention provides an improved method and apparatus for non-contact quantum mechanical heating of thermoplastic fibers by resonant energy absorption of laser energy by the fiber. In one embodied form, the unique method for continuous heating of thermoplastic fibers comprises the steps of: a) preparing a thermoplastic synthetic fiber for heat treatment; b) illuminating the fiber with a beam of radiation from a carbon monoxide continuous wave laser beam of resonant frequency for the prescribed fiber being treated; c) traversing the fiber to be treated across the path of the laser beam in a direction perpendicular to the beam of radiation from the laser source; d) adjusting the rate of traversement of the fiber to maintain the temperature of the thermoplastic fiber within a temperature range of about five percent below the melting point of the thermoplastic fiber to continuously heat the fiber by resonant energy absorption of the laser beam. In a presently preferred embodiment, the unique microheater apparatus is provided comprising a laser heater furnished with a collimator and back reflector, to enhance the heating efficiency of the non-contact quantum mechanical process. The unique microheater apparatus accordingly provides a source of non-contact heat before, after or during a false twisting process or fiber stretching process.

2 Claims, 8 Drawing Sheets

FIG. 1

Properties

Data on fiber properties obtained from the fiber manufacturers. For complete definitions, see ASTM Standards on Textile Materials.

Polyester
A manufactured fiber in which the fiber-forming substance is any long-chain synthetic polymer composed of at least 85% by weight of an ester of a substituted aromatic carboxylic acid, including but not restricted to substituted terephthalate units, $p(-R-O-C-C_6H_4-\overset{\overset{O}{\|}}{C}-O-)$, and parasubstituted hydroxybenzoate units, $p(-R-O-C_6H_4-\overset{\overset{O}{\|}}{C}-O-)$.

Carbon A fiber manufactured by pyrolysis of organic precursor fibers (rayon, polyacrylonitrile or pitch) in an inert atmosphere at 1,000-3,000 C.

Nylon A manufactured fiber in which the fiber-forming substance is a long-chain synthetic polyamide in which less than 85% of the amide $(-\overset{\overset{O}{\|}}{C}-NH-)$ linkages are attached directly to two aromatic rings

Lyocell A manufactured fiber composed of solvent spun cellulose

| Name Asterisk denotes trademark | Photomicrographs Cross section, 500X Longitudinal, 250X | Fiber type RT-Reg. tenacity HT-High tenacity IT-Intermediate tenacity | Std. | Wet | Std. loop | Std. knot |
|---|---|---|---|---|---|---|
| *ACE | | Filament – HT | 9.0 | 9.0 | 6.0-7.0 | 5.0-6.0 |
| *Compet Allied | | Filament – HT | 8.3 | | | |
| | | Filament – HT | 8.9 | | | |
| *Dacron Du pont | | Staple & tow | 2.4-7.0 | 2.4-7.0 | 2.1-6.4 | 2.1-6.4 |
| | | Partially oriented filament | 2.0-2.5 | 2.0-2.5 | | |
| *Fortrel Wellman | | Filament – RT | 2.8-5.6 | 2.8-5.6 | 2.5-5.2 | |
| | | Filament – HT | 6.8-9.5 | 6.8-9.5 | 5.6-5.8 | |
| | | Staple-series 400-RT | 4.8-6.0 | 4.8-6.0 | 4.4-5.6 | |
| | | Staple-series 300-HT | 6.0-6.8 | 6.0-6.8 | 5.6-6.0 | |
| | | Partially oriented filament | 2.0-2.5 | 2.0-2.5 | | |
| *Kodel Eastman | | Staple-series 400-RT | 4.5-5.5 | 4.5-5.5 | 2.8-4.0 | |
| | | Staple-series 400-IT | 5.3-5.5 | 5.3-5.5 | | |
| | | Staple-series 400-HT | 6.6 | 6.6 | | |
| Polyester BASF | | Filament – RT | 4.4-5.0 | 4.4-5.0 | 4.0-4.5 | 2.0-5.6 |
| | | Staple | 3.5-6.0 | 3.5-6.0 | 1.2-5.6 | |
| *Trevira Hoechst Celanese | | Partially oriented filament | 2.0-2.5 | 2.0-2.5 | | 4.0-6.3 |
| | | Filament – HT | 7.2-8.2 | 7.2-8.2 | 4.4-6.7 | |
| *Celion BASF Structural Materials | | High Strength | 24.1 | 24.1 | | |
| | | High Modulus | 21.3 | 21.3 | | |
| | | Ultra-high Modulus | 10.8 | 10.8 | | |
| Nylon 6 | | Staple | 3.5-7.2 | 3.7-6.2 | 3.8-5.6 | 3.8-5.6 |
| | | Monofil. & filament-RT | 4.0-7.2 | 1.7-3.6 | 2.0-3.0 | 2.0-3.0 |
| | | BCF-RT | 2.0-4.0 | 5.8-8.2 | 5.1-10.1 | 4.8-6.7 |
| | | Filament-HT | 6.5-9.0 | 2.5-6.1 | 3.7-5.9 | 3.7-5.9 |
| Nylon 6,6 | | Staple & tow | 2.9-7.2 | 2.0-5.5 | 2.0-5.1 | 2.0-5.1 |
| | | Monofil. & filament-RT | 2.3-6.0 | 5.1-8.0 | 5.0-7.6 | 5.0-7.6 |
| | | Filament-HT | 5.9-9.8 | | | |
| *Tencel Courtaulds | | High-tenacity | 4.8-5.0 | 3.8-4.2 | 2.2-2.6 | 2.1-2.3 |

| Name<br>Asterisk denotes trademark | Elastic Recovery | Average stiffness (gpd) | Average toughness (g cm) | Specific gravity | Moisture regain 70 F, 65% rh % | Moisture regain 70 F, 95% rh % | Effect of heat |
|---|---|---|---|---|---|---|---|
| *ACE | 77 at 5%; 75 at 10% | 55-56 | 0.7 | 1.38 | 0.4 | | A.C.E.: Softens at 464 F. Melts at 500 F.<br>Compet: Melts at 438 F. |
| *Compet<br>Allied | | | 0.9 | 1.38 | 0.4 | | |
| | 81 at 3% | 12-17 | 0.7<br>0.20-1.10 | 1.38<br>1.38 | 0.4<br>0.4 | | Sticks at 440 to 445 F.<br>Melts at 482 F. |
| *Dacron<br>Du Pont | 76 at 3%<br>88 at 3% | 10-30<br>30 | 1.3-1.8<br>0.40-1.10<br>0.50-0.70<br>1.3-1.8 | 1.34<br>1.38<br>1.39<br>1.38 | 0.4<br>0.4 | | Melts at 478 to 490 F. |
| *Fortrel<br>Wellman | 75-85 at 2%; 35-45 at 5% | 40 | 1.3-1.8<br>1.0 | 1.38<br>1.38 | 0.4<br>0.4 | | Melts at 490 F. |
| *Kodel<br>Eastman | | 43<br>65 | 1.29<br>1.1 | 1.38<br>1.38 | 0.4<br>0.4 | | Sticks at 440 to 445 F. Melts at 480 to 485 F. Decomposes at 752 F. |
| Polyester<br>BASF | 55-65 at 5% | 10-30 | 0.95 | 1.38 | 0.4 | 0.6 | Softens at 445 to 465 F.<br>Melts at 495 F. |
| *Trevira<br>Hoechst Celanese | 67-86 at 2%, 57-74 at 5% | 7-31 | 0.28-1.50<br>1.3-1.8 | 1.38<br>1.38 | 0.4<br>0.4 | 0.6 | |
| | 99 at 1% | 54-77 | 0.35-0.55 | 1.38 | 0.4 | 0.6 | Does not melt. Oxidizes very slowly in air at temperatures above 600 F. |
| *Cefion<br>BASF Structural Materials | 100<br>100<br>100 | 1,500<br>2,300<br>3,000 | | 1.77<br>1.77<br>1.96 | | | |
| Nylon 6 | 100 at 2%<br>98-100 at 1-10% | 17-20<br>18-23 | 0.64-0.78<br>0.67-0.90 | 1.14<br>1.14 | 2.8-5<br>2.8-5 | 3.5-8.5<br>3.5-8.5 | Melts at 419 to 430 F. Slight discoloration at 300 F. when held for 5 hr. Decomposes at 600 to 730 F. |
| Nylon 6,6 | 99-100 at 2-8%<br>82 at 3%<br>88 at 3%<br>89 at 3% | 29-48<br>10-45<br>5-24<br>21-58 | 0.75-0.84<br>0.58-1.37<br>0.8-1.25<br>0.8-1.28 | 1.14<br>1.13-1.14<br>1.13-1.14<br>1.13-1.14 | 2.8-5<br>4.0-4.5<br>4.0-4.5<br>4.0-4.5 | 3.5-8.5<br>6.1-8.0<br>6.1-8.0<br>6.1-8.0 | Sticks at 445 F. Melts at 480 to 500 F. Yellows slightly at 300 F. when held for 5 hr. |
| *Tencel<br>Courtaulds | | 30 | 0.34 | 1.56 | 11.5 | | Does not melt. Loses strength at about 300 F & begins to decompose at about 350 F under extended periods of exposure |

FIG. 2C

| Properties | Name (Asterisk denotes trademark) | Photomicrographs Cross section, 500X Longitudinal, 250X | Fiber type RT-Reg. tenacity HT-High tenacity IT-Intermediate tenacity | Breaking tenacity (gpd) | | | |
|---|---|---|---|---|---|---|---|
| Data on fiber properties obtained from the fiber manufacturers. For complete definitions, see ASTM Standards on Textile Materials. | | | | Std. | Wet | Std. loop | Std. knot |
| Rayon A manufactured fiber composed of regenerated cellulose, as well as manufactured fibers composed of regenerated cellulose in which substituents have replaced not more than 15% of the hydrogens of the hydroxyl groups. | *Fibro Courtaulds | | RT-Multi-lobed IT-0.9 den and up, 0.25 in. and up | 2.3 3.0 | 1.1 1.5 | | |
| | Cuprammonium | | Filament | 1.95-2.0 | 0.95-1.1 | 2.15-2.25 | |
| | Rayon North American Rayon Corp. | | Filament-RT Filament-HT | 1.9-2.3 4.9-5.3 | 1.0-1.4 2.8-3.2 | | |
| | *Sosran Pittsfield Weaving | | Monofilament | 1.2-2.2 | 1.2-2.2 | 0.7-1.1 | 1.0-1.7 |
| Acetate A manufactured fiber in which the fiber-forming substance is cellulose acetate. | Acetate | | Filament & staple | 1.2-1.4 | 0.8-1.0 | 1.0-1.2 | 1.0-1.2 |
| Sulfar The fiber-forming substance is a long chain synthetic polysulfide with at least 85% of the sulfide linkages attached directly to two aromatic rings | *Ryton(PPS) Philips | | Staple | 3.0-3.5 | 3.0-3.5 | | |
| Acrylic A manufactured fiber in which the fiber-forming substance is any long-chain synthetic polymer composed of at least 85% by weight of acrylonitrile units (-CH2-CH-) | *Acrilan Monsanto | | Staple & tow | 2.2-2.3 | 1.8-2.4 | | 1.9-2.6 |
| | *Creslan American Cyanamid | | Staple & tow | 2.0-3.0 | 1.6-2.7 | 1.9-2.3 | |
|   CN | *Monnacryl Mann Industries | | Staple, tow and pulp | 3.0-4.0 | | | |
| Modacrylic Unless rubber or anidex, the fiber-forming substance is a long-chain synthetic polymer containing 35-85% acrylonitrile units. | *SEF Monsanto | | Staple | 1.7-2.6 | 1.5-2.4 | | 1.6-2.5 |
| Olefin A manufactured fiber in which the fiber-forming substance is any long-chain synthetic polymer composed of at least 85% by weight of ethylene propylene or other olefin units | Polyethylene Hercules | | Monofilament-conventional (low density) Monofilament (incl. flat linear (high density) Staple | 1.0-3.0 3.5-7.0 3.5-4.5 | 1.0-3.0 3.5-7.0 3.5-4.5 | 2.5-4.0 3.0-4.0 | 1.0-2.5 2.5-4.5 |
| | *Herculon Hercules | | | | | | |

| Fiber | | | | | | Notes |
|---|---|---|---|---|---|---|
| *Fibro<br>Courtaulds | | | | 1.53 | 11 | 27 | Does not melt. Loses strength at 300 F and decomposes at 350 to 464 F under extended periods of exposure |
| Cupramonium | | | | 1.53 | 11 | 27 | Does not soften, stick or melt. Decomposes at 350 F under extended exposure |
| Rayon<br>North American Rayon Corp. | | | | 1.48–1.54<br>1.48–1.54 | 11<br>11 | | Does not melt. Loses strength at 300 F and begins to decompose at about 325 F. |
| *Saran<br>Pittsfield Weaving | 95 at 5–10% | 5–10 | 0.165–0.265 | 1.7+/-5% | 0 | N/A | Melts at 240–280 F; will not support combustion; self extinguishing |
| Acetate | 48–65 at 4% | 3.5–5.5 | 0.17–0.30 | 1.32 | 6.3–6.5 | 14 | Sticks at 350 to 375 F. Softens at 400 to 445 F. Melts at 500 F. |
| *Ryton (PPS)<br>Phillips | 100% at 2%; 96% at 5%<br>86% at 10% | 10–20 | | 1.37 | 0.6 | | Outstanding resistance to heat (melts at 285 C). Excellent resistance to aerial oxidation, most chemicals. Retains 70%+ original strength to 400 F for 5,000 hr. |
| *Acrilan<br>Monsanto | 99 at 2%, 89 at 5% | 5–7 | 0.4–0.5 | 1.17 | 1.5 | 3–5 | Does not melt. |
| *Creslan<br>American Cyanamid | | 6.0–8.0 | 0.62 | 1.17 | 1.0–1.5 | 2.0–2.5 | Sticks at 430 to 450 F.<br>Safe ironing at 300 F. |
| *Mannocryl<br>Mann Industries | 94 at 1%, 86 at 3%;<br>58 at 10% | 11 | 0.57–0.60 | 1.17 | 1.5–2.5 | 3–5 | Mannocryl producer colored sticks at 490 F. Both are safe ironing at 300 F. |
| *SEF<br>Monsanto | 100 at 1%; 99.5 at 2%<br>99 at 5%; 95 at 10% | 3.8 | 0.5 | 1.35 | 2.5 | Negligible | Does not melt. Boiling water shrinkage equals 1%. Excellent resistance to shrinkage in dry heat. At 390 F, 5% shrinkage. |
| Polyethylene<br>Hercules | Up to 95 at 5%, 88 at 10%<br>Up to 100 at 1–10%<br>95 at 5%, 90 at 10% | 2–12<br>20–50<br>20–30 | 0.3<br>1–3 | 0.92<br>0.95–0.96<br>0.90 | Negligible<br>Negligible<br>0.01 | Negligible | Conv. soft at 225 to 235 F. melts at 230 to 250 F.<br>Lin. 240 to 260 F. 255 to 280 F. Conv. shrinks 5–8% at 165 F. 50–60% at 212 F. Lin.: 3–5% at 165 F, 8–12% at 212 F. |
| | 96 at 5%, 90 at 10%<br>90–93 at 5%, 80–85 at 10% | 20–30<br>3–10 | 1–3<br>1.5–4 | 0.91<br>0.90 | 0.01<br>–0.1 | | Softens at 285 to 330 F. Melts at 320 to 350 F.<br>Decomposes at 350F. Zero to 5% shrinkage at 212 F;<br>5 to 12% at 265 F. |
| | 92–96 at 5%, 85–90 at 10% | 12–25 | 0.75–3.00 | 0.91 | –0.1 | | Fiber softens at 300–320 F. Melts at 320–340 F.<br>Decomposes at 550 F.<br>Softens at 285–340 F. Melts at 325–340 F.<br>0–5% shrinkage |

Properties
Data on fiber properties obtained from the fiber manufacturers. For complete definitions, see ASTM Standards on Textile Materials.

| Name (Asterisk denotes trademark) | Photomicrographs Cross section, 500X Longitudinal, 250X | Fiber type RT-Reg. tenacity HT-High tenacity IT-Intermediate tenacity | Breaking tenacity (gpd) Std. | Wet | Std. loop | Std. knot |
|---|---|---|---|---|---|---|
| *Marvess, *Alpha  Phillips | | Bulk Filament | 3.0–4.0 | 3.0–4.0 | 2.5–3.5 | |
| | | Staple & tow | 2.0–5.0 | 2.0–5.0 | | |
| *Essera, *Amoco XXV, *Marquesa Lana, Patlon III  Amoco | | Multifilament | 2.5–5.5 | 2.5–5.5 | | |
| | | Multifilament BCF | 2.5–3.5 | 2.5–3.5 | | |
| | | Staple | 2.5–4.0 | 2.5–4.0 | | |
| *Spectra 900 | | Spectra 900 | 30 | 30 | | |
| *Spectra 1000  Allied | | Spectra 1000 | 35 | 35 | | |
| | | Staple | 2.5–5.5 | 2.5–5.5 | | |
| *Fibrilon  Synthetic Industries | | Fibrillated | 3.5–5.0 | 2.5–5.0 | | |
| | | Multifilament – RT | 2.5–5.5 | 2.5–5.5 | | |

Spandex A manufactured fiber in which the fiber-forming substance is a long-chain synthetic polymer comprised of at least 85% of a segmented polyurethane

| | | | | | | |
|---|---|---|---|---|---|---|
| *Glospan/Cleerspan, S-85  Globe | | Multifilament | 0.7 | | | |
| *Lycra  Du pont | | Coalesced monofilament– Types 126, 127 | 1.0 | | | |
| | | Type 128 | 0.8 | | | |

Glass A manufactured fiber in which the fiber-forming substance is glass

| Glass | | Single Filament–E glass | 15.3 | 15.3 | | |
| | | Single Filament–S glass | 19.9 | 19.9 | | |
| | | Multifilament | 9.6 | 6.7 | 4.0 | 0.9 |

Aramid A manufactured fiber in which the fiber-forming substance is a long-chain synthetic polyamide in which at least 85% of the amide (−C−NH−) linkages are attached directly to two aromatic rings
                                                                              ‖
                                                                              O

| *Kevlar  Du Pont | | Kevlar & Kevlar 29/Kevlar 49 | 23 | 21.7 | 10.5 | 7.6 |
| | | Kevlar 149 | 18 | | | |
| | | Kevlar 68 | 23 | | | |
| | | Kevlar HT (129) | 26.5 | | | |
| *Nomex  Du Pont | | Staple & filament | 4.0–5.3 | 3.0–4.1 | 4.0–5.0 | 2.5–3.3 |

Fluorocarbon Fiber formed of long-chain carbon molecules, available bonds saturated with fluorine

| *Gore-Tex  W. L. Gore | | Expanded PTFE staple, filament, tow & slit film – RT | 3.0–4.0 | 3.0–4.0 | 2.5–3.3 | 2.5–3.3 |
| *Teflon  Du Pont | | TFE multifilament staple, tow & flock | 0.0–2.0 | 0.0–2.0 | 0.8–1.4 | 0.8–1.4 |
| | | FEP monofilament | 0.5 | 0.5 | | |

FIG. 2F

| Material | | | | | | Notes |
|---|---|---|---|---|---|---|
| *Marvess | 96 at 5%, 90 at 10% | 20-30 | 1-3 | 0.91 | 0.01 | 550 F. Zero to 5% shrinkage at 212 F.; 5 to 12% at 265 F. |
| *Alpha Phillips | 90-93 at 5%, 80-85 at 10% | 3-10 | 1.5-4 | 0.90 | -0.1 | Fiber softens at 300-320 F. Melts at 320-340 F. Decomposes at 550 F. |
| *Essera, *Amoco | 92-96 at 5%, 85-90 at 10% | 12-25 | 0.75-3.00 | 0.91 | | Softens at 285-340 F. Melts at 325-340 F. 0-5% shrinkage at 212 F. 5-12% shrinkage at 265 F. |
| XXV, *Marquesa, Lana, *Patlon III, Amoco | 85-95 at 5%, 65-90 at 10% | 5-10 | 0.9-1.05 | 0.90-0.91 | 0.01-0.1 | |
| *Spectra 900 | | 1,400 | | 0.90-0.91 | 0.01-0.1 | Melts at about 300 F. |
| *Spectra 1000 Allied | | 2,000 | | 0.97 | Negligible | Negligible |
| *Florilon Synthetic Industries | 93 at 5%, 85 at 10% | | | 0.97 | | Fiber softens at 290-310 F. Melts at 290-310 F. at 320 F. and decomposes at 550 F. |
| | 85 at 5%, 75 at 10% | | | 0.91 | 0.01 | |
| | 95 at 5%, 85 at 10% | 12-25 | 0.75-3.00 | | | |
| *Glospan/ Cleerspan, S-85 Globe | 99 at 50% (S-7) | 0.17 (S-7) | | 1.2; | Less than 1 | Good dimensional stability. Sticks at 420 F. |
| | 98 at 200% (S-5) | 0.05 (S-5) | | 1.04-1.06 (S-85) | | |
| | | 0.06-0.085 | | | | |
| *Lycra Du Pont | 97 at 50% | 0.13-0.20 | 2.00 | 1.21 | 1.3 | Good dimensional stability. Can be heat set. Sticks at 347-392 F. Melts at 446 F. |
| | 99 at 200% | | | 1.2 | | |
| Glass | 100 | 320 | 0.37 | 2.54-2.69 | None | Up to 0.3 | None burn. At 650 F. E holds 75% tensility; S80%; multi; 50%, E softens at 1,350 to 1,611 F. Melts at 2,050 to 2,160 F. S softens at 1,560 to 1,778 F.; melts at 2,720 F. |
| | 100 | 380 | 0.53 | 2.48-2.49 | None | Up to 0.3 |
| | 100 | 310 | 0.15 | 2.5 | None | Up to 0.3 |
| *Kevlar Du Pont | 100 at 1%, 2%, 3% | 500/900 | | 1.44 | 4.3 | 6.5/6.0 | Difficult to ignite. Does not propagate flame. Does not melt. Decomposes at about 900 F. |
| | 100 at 1% | 1,110 | | 1.47 | 1.2 | 2.3 |
| | 100 at 1%, 2% | 780 | | 1.44 | 4.3 | |
| *Nomex Du Pont | 100 at 1%, 2% | 755 | | 1.44 | 4.3 | 12.5 | Does not melt. Decomposes at 700 F. |
| | | 70-120 | 0.85 | 1.38 | 6.5 | |
| *Gore-Tex W. L. Gore | | | | 0.8-2.2 | 0 | 0 | Extremely heat resistant. Can be safely used from -350 F to +550 F. Melts at 620 F. |
| *Teflon Du Pont | | 1.2-8.8 | 0.15 | 2.1 | 0 | 0 | (TFE) Extremely resist. Safely used at -350 F to +550 F. Melts at 620 F. (FEP) Highly resist. Melts at 550 F. Sublimation = 0.0002%/hr @ 554 F. Vapors toxic. |
| | | 1.0 | 0.10-0.12 | 2.1 | | |
| PBI Hoechst Celanese | | 9-12 | 0.40 | 1.43 | 15 | 20 | Will not ignite. Does not melt. Decomposes in air at 360 F. Retains fiber integrity and suppleness upon flame exposure. High char yield |

FIG. 3

MICRO HEATING APPARATUS FOR SYNTHETIC FIBERS AND RELATED METHODS

BACKGROUND OF THE INVENTION

1. Field of the Invention

The subject invention relates to a unique method and apparatus for continuous uniform heating synthetic fibers by resonant absorption of laser energy.

2. Description of the Prior Art

Thermoplastic man made fibers can be permanently heat-set after drawing and orientation. The fiber will possess structural integrity and will maintain its desired configuration below the prescribed heat set temperature. Thermoplastic fibers or yarns from these fibers can be processed with conventional "long" and "short" direct contact heaters used for a variety of purposes in the textile industry. Yarns made from thermoplastic fiber in the form of a continuous filament are capable of a pronounced degree of stretch and rapid recovery and can be subjected to an appropriate combination of deforming, heat setting and development treatments. These yarns can also be bulked.

Twist yarn is made by a continuous process on the false twist principle, where two or more yarns are fed to a twister which inserts extra twist to double them, heat sets the yarns and then untwists the plural yarns and winds them on plural separate spools.

Conventional microfiber production typically consists of taking a higher denier fiber, placing it in a conventional contact heater and then directing the fiber to a drawing machine where it is stretched to a smaller diameter (smaller denier).

Conventional false twist and heat stretching may be accomplished by use of so-called "short heaters" or "long heaters".

The main advantages associated with conventional "short heaters" over "long heaters" include: (1) Relatively shorter yarn paths with the ability to have a truly linear yarn path; (2) Greater flexibility of process parameters and end products; (3) Self-cleaning properties of the heater; and (4) Better textile characteristics at today's existing speeds or higher production speeds and resultant identical textile characteristics.

With conventional "short heater" technology, heater temperatures generally are maintained in a substantially constant range regardless of the type of yarn or denier. For example, heavier denier polyester is typically heat treated within a temperature range of between about 205 degrees C. to about 215 degrees C. Higher temperature levels will generally vary with the type of raw material, the total denier, the denier per filament and the linear speed, thereby having a direct positive effect on reduction of power consumption. In addition, the consumed power of the high temperature short heater without yarn is dramatically reduced compared to today's conventional long heater technology on the basis of the much shorter length of 600 mm verses the 2,500 mm of the long heater. Typically, the heater surface in contact with the atmosphere is reduced four to five times, thereby minimizing loss of heat with a resultant decrease in consumed energy.

Conventional processing heaters, however, typically utilized direct-contact heat, for instance, a heated metal plate to heat the fiber. Such heaters are relatively inefficient because they heat not only the fiber being processed, but also the surrounding area. Additionally, conventional heaters are generally two to three meters in length, requiring relatively large processing area to accommodate such equipment.

Laser treatment of fibers is also known to the art. For instance, Japanese Patent No. 59-157,310 relates to a thick and thin synthetic fiber and a method for its manufacture. A method for manufacturing the thick fiber is disclosed having variations in refractive index in the direction of the fiber access and thick and thin sections which is characterized by the fact that the oriented thermoplastic synthetic fiber is subject to intermittent irradiation with laser light under tension. Accordingly, the Japanese patent disclosure is directed to varying the diameter of the fiber over its length by means of an intermittent heating or pulse heating to portions of the fiber.

Bossman, et al. in U.S. Pat. No. 5,017,423 discloses the use of a laser to remove material from the fiber that is to be treated to reduce the denier.

Macken, et al. in U.S. Pat. No. 4,156,124 discloses image transfer laser engraving. The Macken, et al. apparatus and method relies upon indexing of the work piece in relation to the pattern mask.

Kajikawa, in U.S. Pat. No. 4,950,862 discloses laser machining apparatus using a focusing lens array to delivery laser energy to the sample being treated.

Accordingly, there exists a need for an improved method and apparatus which will produce an even heating of the fiber in a uniform manner. Those skilled in the art have recognized a significant need for an improved process and apparatus for even and continuous heating to produce false twist and/or diameter reduction of the fiber such as by stretching, so that it results in a microfiber. Moreover, those skilled in the art recognized a significant need for processing equipment which will reduce the size of conventional "long heaters" and "short heaters" and which will be energy efficient. The present invention fulfills these needs.

SUMMARY OF THE INVENTION

This invention provides an improved method and apparatus for non-contact quantum mechanical heating of thermoplastic fibers by resonant energy absorption of laser energy by the fiber. In one embodied form, the unique method for continuous heating of thermoplastic fibers comprises the steps of: a) preparing a thermoplastic synthetic fiber for heat treatment; b) illuminating the fiber with a beam of radiation from a carbon monoxide continuous wave laser beam of resonant frequency for the prescribed fiber being treated; c) traversing the fiber to be treated across the path of the laser beam in a direction perpendicular to the beam of radiation from the laser source; d) adjusting the rate of traversement of the fiber to maintain the temperature of the thermoplastic fiber within a temperature range of below about five (5%) of the melting point of the thermoplastic fiber to continuously heat the fiber by resonant energy absorption of the laser beam.

In a presently preferred embodiment, the unique microheater apparatus comprises a laser heater furnished with a collimator and back reflector, employed to enhance the efficiency of the invention. In this respect a collimated laser beam with back reflector, i.e., "Laser Heater" is provided. The inventive Laser Heater will have a traversement path of from about 127 mm to 1M in length and will be about 50 mm to 101 mm in diameter. In false twist processing, the Laser Heater can be a source of non-contact heat before, after or during the false twisting process. For this process separate laser beams are utilized for each yarn processed.

For the diameter reduction of the yarn, several yarns are drawn through the Laser Heater at one time. Typically, the non-contact heat zone is from about 127 mm to about 1M in length and from about 50 mm to about 101 mm in diameter with approximately no more than 5% variance in heat from the center to the outer circumference of the furnace. Several yarns can accordingly be drawn through the heat zone at one time.

In the foregoing diameter reduction embodiment, the established heating zone is established between one or more spools of yarn on each side. Accordingly, the diameter reduction of the yarn(s) being drawn through this Laser Heater is a function of three factors (1) the adjusted heat in the Laser Furnace, (2) the draw tension on the yarn(s) and, (3) the traversement speed of the yarn(s).

The wavelength of laser energy for the heat treatment will vary depending upon the thermoplastic fiber to be process. Accordingly, the wavelength can range from Infrared (IR) to visible/Ultraviolet of the Electromagnetic spectrum depending upon the absorption spectrum of the particular fiber. The heating of the fiber results from exciting it to a higher energy state by absorption of a resonant wavelength. This energy has to be eventually dissipated so the fiber (a molecular polymer) can relax to a stable ground state. This relaxation process is dependent on the type of laser energy utilized. For visible/Ultraviolet, the energy is released through fluorescence (non heat), and internal conversion to IR energy which eventually becomes classical heat (all wavelengths). For IR absorption, the energy eventually converts one hundred percent to classical heat within the cell, thus, evenly heating fibers for conventional machine processes (i.e., drawing and false twisting.

This invention may be used to heat a wide variety of thermoplastic fibers including but not limited to, *A.C.E., *Compet, *Dacron, *Fortrel, *Kodel, Polyester, *Trevira, *Celion, Nylon 6, Nylon 6.6, *Tencel, *Fibro, Cuprammonium, *Saran, Acetate, *Ryton (PPS), Phillips, *Acrilan, *Cresian, *Mannacryl, *SEF, Polyethylene, *Herculon, *Marvess, *Alpha, *Essera, *Amoco XXV, *Marquesa Lana, Patlon III, *Spectra 900, *Spectra 1000, *Fibrilon, *Glospan/Cleerspan, S-85, *Lycra, Glass, *Kevlar, *Nomes, *Gore-Tex, *Teflon and PBL.
*denotes trademark.

DETAILED DESCRIPTION OF THE INVENTION

This invention provides an improved method and apparatus for non-contact quantum mechanical heating of thermoplastic fibers by resonant energy absorption of laser energy by the fiber. In one embodied form, the unique method for continuous heating of thermoplastic fibers comprises the steps of: a) preparing a thermoplastic synthetic fiber for heat treatment; b) illuminating the fiber with a beam of radiation from a carbon monoxide continuous wave laser beam of resonant frequency for the prescribed fiber being treated; c) traversing the fiber to be treated across the path of the laser beam in a direction perpendicular to the beam of radiation from the laser source; d) adjusting the rate of traversement of the fiber to maintain the temperature of the thermoplastic fiber within a temperature range of below about five (5%) of the melting point of the thermoplastic fiber to continuously heat the fiber by resonant energy absorption of the laser beam.

In a presently preferred embodiment, the unique microheater apparatus is a laser heater furnished with a collimator and back reflector, employed to enhance the efficiency of the invention. In this respect a collimated laser beam with back reflector, i.e., "Laser Heater" is provided. The inventive Laser Heater will have a traversement path of from about 127 mm to 1M in length and will be about 50 mm to 101 mm in diameter. In false twist processing, the Laser Heater can be a source of non-contact heat before, after or during the false twisting process. For this process separate laser beams are utilized for each yarn processed.

For the diameter reduction of the yarn, several yarns are drawn through the Laser Heater at one time. Typically, the non-contact heat zone is from about 127 mm to about 1M in length and from about 50 mm to about 101 mm in diameter with approximately no more than 5% variance in heat from the center to the outer circumference of the furnace. Several yarns can accordingly be drawn through the heat zone at one time.

Laser Heater is only a replacement heater for a conventional heater that is utilized on any drawing machine or any other textile processing machine, and is not a heater and drawing or processing machine in one.

The wavelength of laser energy for the heat treatment will vary depending upon the thermoplastic fiber to be process. Accordingly, the wavelength can range from Infrared (IR) to visible/Ultraviolet of the Electromagnetic spectrum depending upon the absorption spectrum of the particular fiber. The heating of the fiber results from exciting it to a higher energy state by absorption of a resonant wavelength. This energy has to be eventually dissipated so the fiber (a molecular polymer) can relax to a stable ground state. This relaxation process is dependent on the type of laser energy utilized. For visible/Ultraviolet, the energy is released through fluorescence (non heat), and internal conversion to IR energy which eventually becomes classical heat (all wavelengths). For IR absorption, the energy eventually converts on hundred percent to classical heat within the cell, thus, evenly heating fibers for conventional machine processes (i.e., drawing and false twisting.

This invention may be used to heat a wide variety of thermoplastic fibers if a commercially available laser exists that is in resonance with the following but not limited to, *A.C.E., *Compet, *Dacron, *Fortrel, *Kodel, Polyester, *Trevira, *Celion, Nylon 6, Nylon 6.6, *Tencel, *Fibro, Cuprammonium, *Saran, Acetate, *Ryton (PPS), Phillips, *Acrilan, *Cresian, *Mannacryl, *SEF, Polyethylene, *Herculon, *Marvess, *Alpha, *Essera, *Amoco XXV, *Marquesa Lana, Patlon III, *Spectra 900, *Spectra 1000, *Fibrilon, *Glospan/Cleerspan, S-85, *Lycra, Glass, *Kevlar, *Nomes, *Gore-Tex, *Teflon and PBL.
*denotes trademark.

Figure 1:
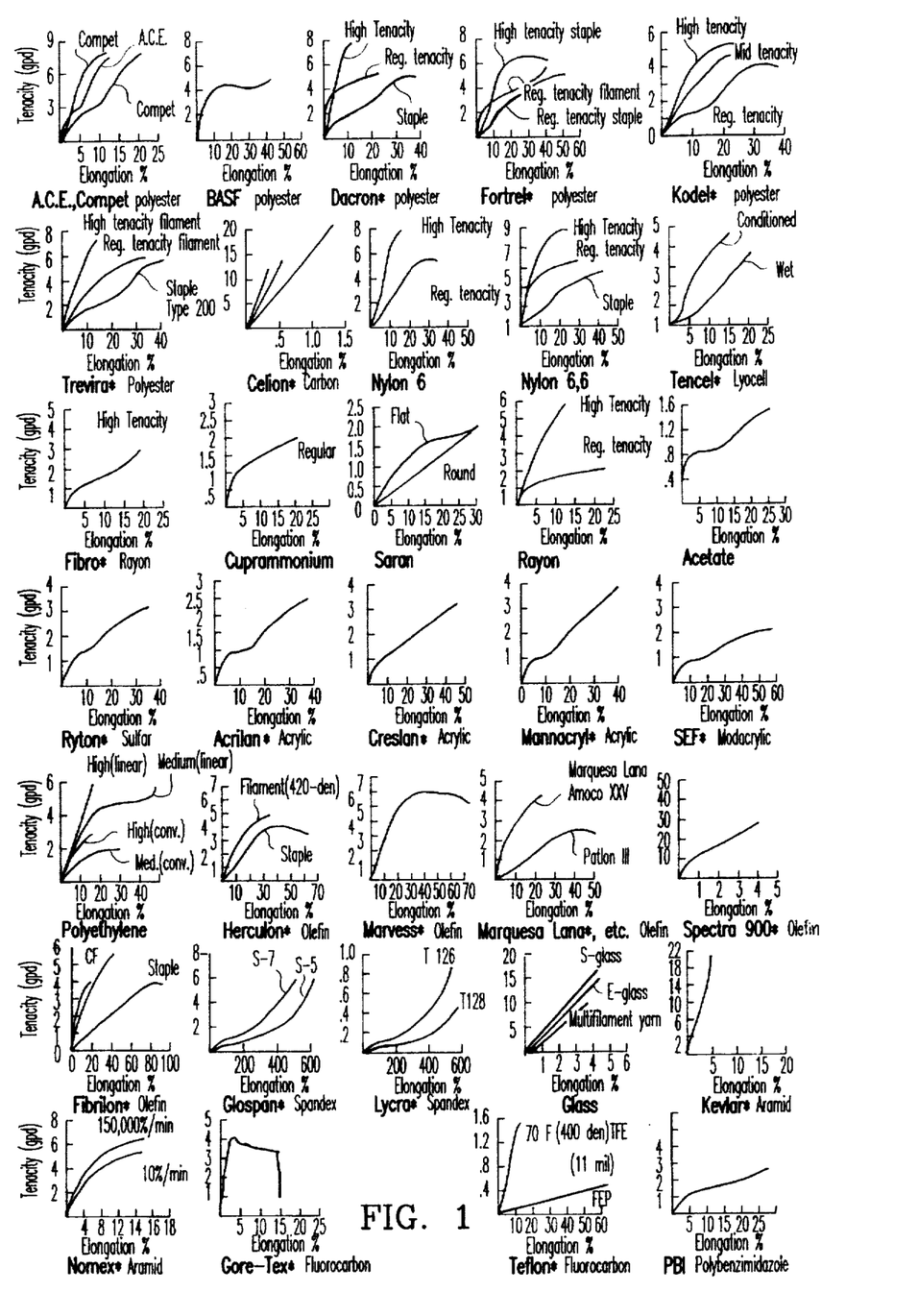
FIG. 1 is an illustration of typical stress-strain curves of various thermoplastic fibers to be treated in accordance with the present invention.

In this respect, FIG. 1 illustrates typical stress-strain curves of various thermoplastic fibers to be treated in accordance with the present invention. Accordingly, the present invention provides a non-contact quantum mechanical heating process utilizing selective resonance energy heating technology. In this regard, infrared (IR) or visible/ ultraviolet (UV) wavelength energy is utilized for the heating source. The thermoplastic fiber is excited to a higher energy state by absorption of laser energy of a resonance wavelength. This energy is eventually dissipated so the fiber (a molecular polymer) can relax to the stable ground state. The relaxation process involves the release of energy through fluorescence, and/or internal energy conversion to IR energy which becomes classical heat. It is this conversion process where: 1) the visible/UV absorbed energy in a electronic state interconverts through a vibronic state (a combination vibrational and electronic state) to internal heat that eventually through the classical laws of physics becomes classical heat (i.e., heat transfers from a hot to a cold body), or 2) the IR absorbed energy in a vibrational manifold transforms into classical heat.

The following generic polymer continuous filament fibers and their respective melting points are set forth below:

| Polyester | 490 degrees F. |
|---|---|
| Acrylic | 440 degrees F. |
| Nylon | 425 degrees F. |
| Olefins | 235 to 350 degrees F. |
| Polypropylene | 335 degrees F. |

Figure 2D:
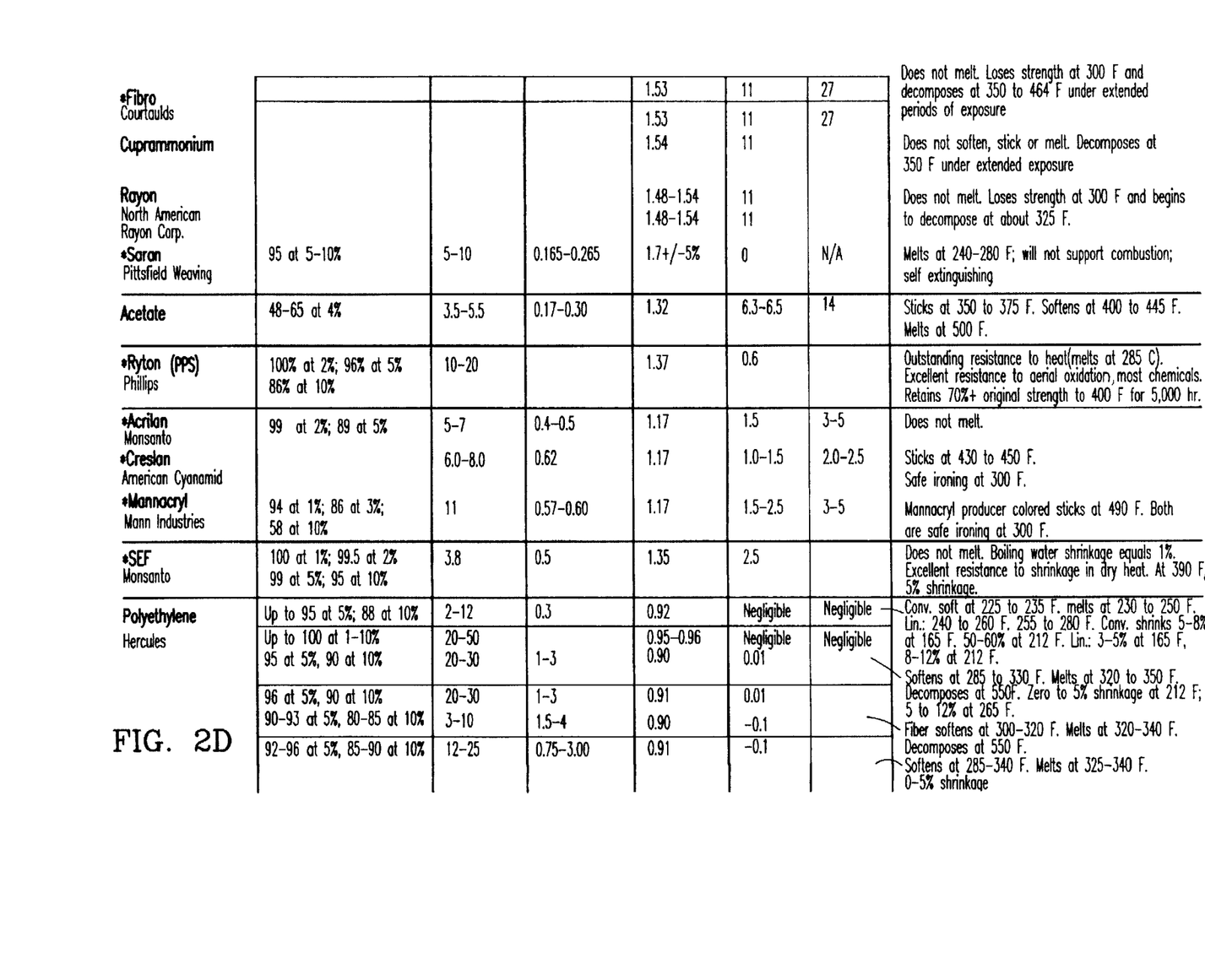
FIG. 2 is a chart depicting typical melting points for thermoplastic fibers to be treated in accordance with the present invention.
Figure 2E:
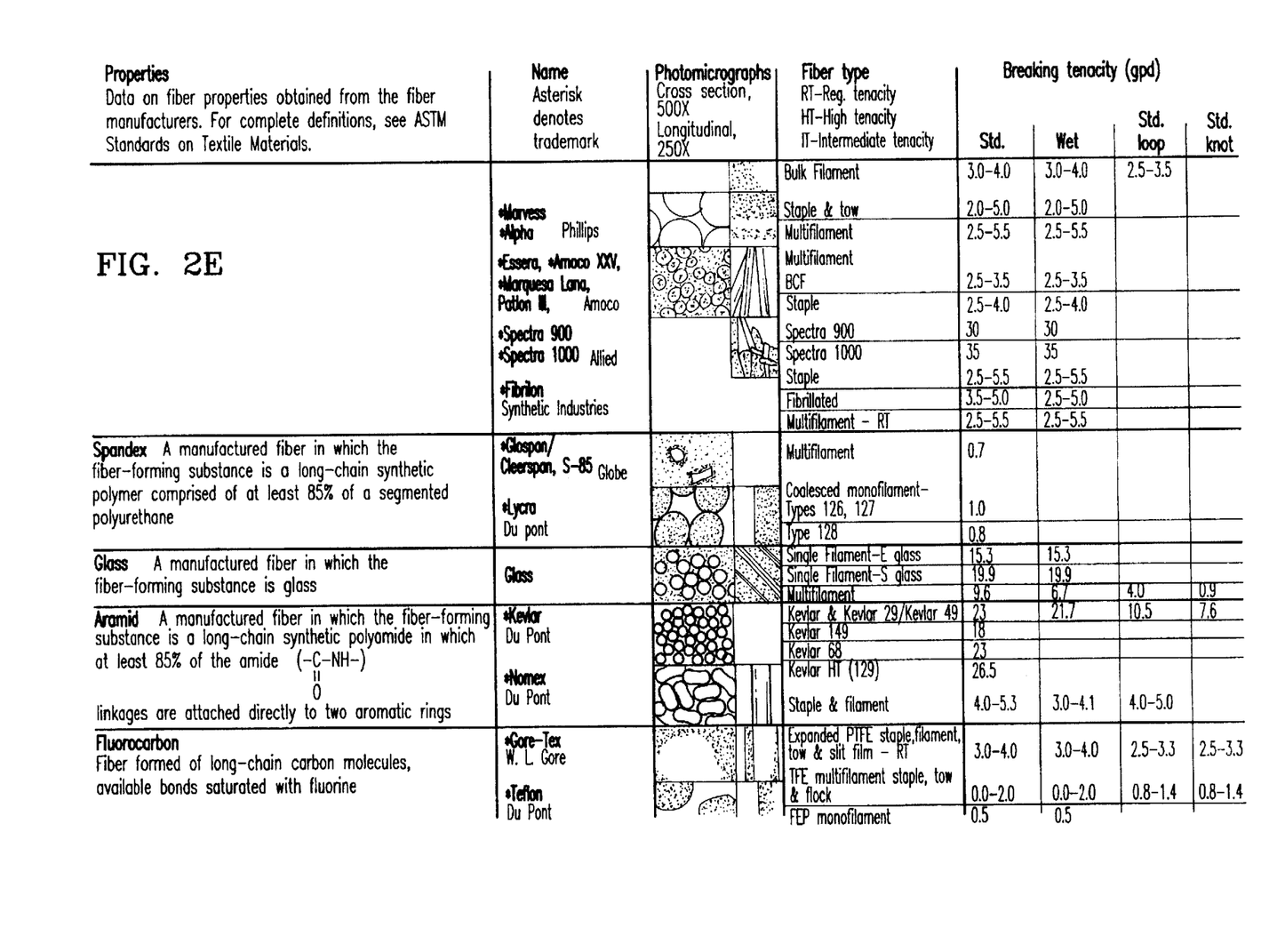

FIG. 2 is a chart setting forth typical melting points for specific species of fibers within the foregoing classes.

The advantages of the inventive laser heating method are as follows:

1. The physical size of the machine will be reduced;
2. Its operation will be cost effective and energy efficient;
3. Higher productivity, because of faster machine speeds;
4. Better yarn quality control, because of more even and consistent heat control.

The actual temperatures for this procedure is 15 to 20 degrees below the melting point to each fiber.

Figure 3:
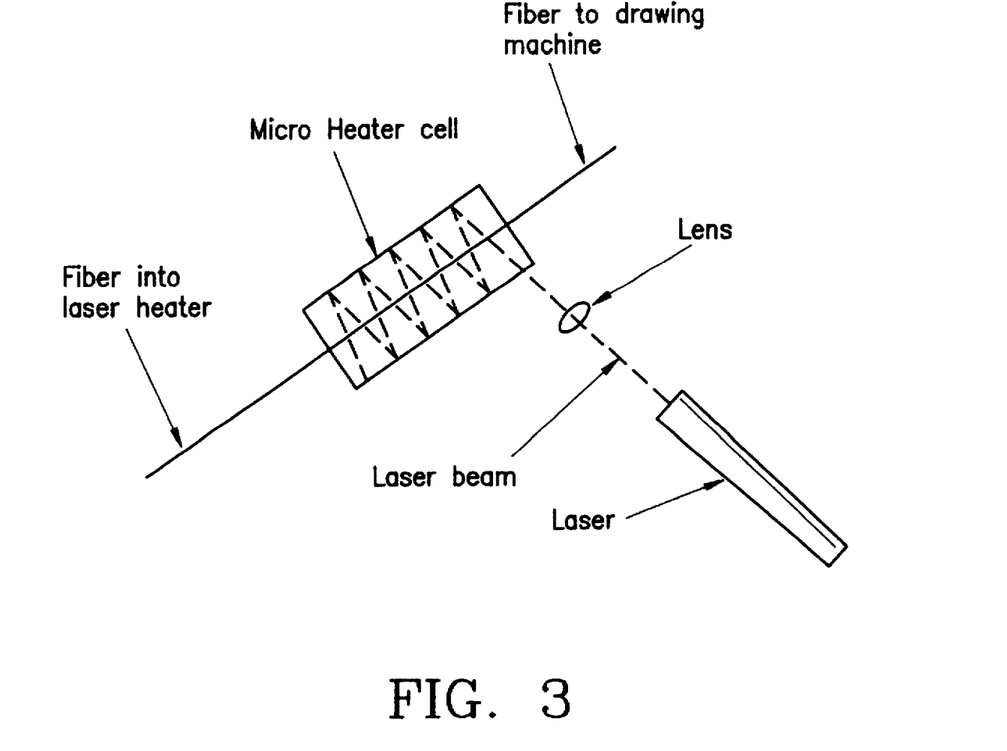
FIG. 3 is a schematic of one embodied laser furnace in accordance with the present invention.

In a presently preferred embodiment, the unique micro heater consists of a heater cell and a laser with its appropriate optical train (correct bandwidth transmission) as the source as illustrated in FIG. 3. The laser furnace is approximately 0.0762 meters in length and is constructed of surface metal. The outside housing of the furnace is thermally insulated to prevent the loss of heat to the external surroundings. Optionally, the internal surface of the laser housing may be treated with a reflective coating that is wavelength dependent. This coating can be designed for either specular or diffuse reflection of the laser energy beam. The number of specular reflections will be controlled by the orientation of the laser furnace with respect to the laser beam. Thus, as the angle approaches eighty-nine degrees the number of reflections traversing the length of the cell internally, greatly increases as depicted in FIG. 3.

The wavelength is determined by the absorption spectrum for the fiber being processed. From observation of this absorption spectrum, the strongest discreet absorption bands can be ascertained.

Depending on the design, a suitable optical train can be a lens, beam expander (for multiple fiber processing) or fiber optics. By control of the speed of the given fiber, such as by conventional adjustable winding spools, traversing the micro heater and the energy of the laser beam, the temperature of the fiber can be regulated so that the fiber constantly remains at the specified temperature range just below its melting point. At this temperature, conventional fiber processing (i.e., drawing denier reduction and false twist) possible.

In the presently preferred embodiment the laser heater apparatus has an effective length of approximately 0.0762 meters and utilizes a carbon monoxide laser for denier reduction of polyester fibers. Thus, the physical size of the machinery is greatly reduced with consequent savings in operating and overhead costs. As the inventive technology involves quantum mechanical heating, the processing rate is vastly improved over conventional technology.

While this one particular form of the invention has been illustrated and described, various modifications can be made without departing from the spirit and scope of the invention. Accordingly, it is not intended that the invention be limited, except as by the appended claims.

I claim:

1. An improved method for non-contact quantum mechanical heating of thermoplastic fibers by resonant energy absorption of laser energy by the fiber, comprising the steps of:

a) providing a thermoplastic synthetic fiber for heat treatment;

b) illuminating the fiber with a beam of radiation from a carbon monoxide continuous wave laser beam of resonant frequency for the prescribed fiber being treated;

c) traversing the fiber to be treated across the path of the laser beam in a direction perpendicular to the beam of radiation from the laser source; and d) adjusting the rate of traversement of the fiber in a microheater apparatus to maintain the temperature of the thermoplastic fiber with a temperature range of about five percent below the melting point of the thermoplastic fiber to continuously heat the fiber by resonant energy absorption of the laser beam, wherein the improvement is that the microheater is a microheater apparatus comprising a microheater cell having an internal reflective coating which is wavelength dependant on the laser beam being directed into said cell and an optical train directing the laser beam into the heating cell.

2. The improved method for non-contact quantum mechanical heating of thermoplastic fibers as defined in claim 1, wherein the thermoplastic synthetic fiber is polyester.

* * * * *